United States Patent
Ehrlich

(10) Patent No.: US 7,345,589 B2
(45) Date of Patent: Mar. 18, 2008

(54) CONCRETE WETTING ALARM SYSTEM

(76) Inventor: Dusty Ehrlich, P.O. Box 833, Windsor, CO (US) 80550

( * ) Notice: Subject to any disclaimer, the term of this patent is extended or adjusted under 35 U.S.C. 154(b) by 279 days.

(21) Appl. No.: 11/186,127

(22) Filed: Jul. 20, 2005

(65) Prior Publication Data

US 2007/0018835 A1    Jan. 25, 2007

(51) Int. Cl.
*G08B 21/00*    (2006.01)
(52) U.S. Cl. .................. 340/603; 340/616; 340/606; 340/612; 340/868.1; 366/61
(58) Field of Classification Search ........... 340/603, 340/616, 606, 610, 612, 618, 686.1; 701/29, 701/36, 34; 366/61, 44
See application file for complete search history.

(56) References Cited

U.S. PATENT DOCUMENTS

| | | | | |
|---|---|---|---|---|
| 4,846,581 A | * | 7/1989 | Osterlund et al. | ............ 366/61 |
| 5,436,615 A | * | 7/1995 | Williams | .................... 340/616 |
| 5,966,311 A | * | 10/1999 | Stemporzewski et al. | ... 700/281 |
| 5,969,619 A | * | 10/1999 | Niemiro et al. | ............. 340/618 |
| 6,484,079 B2 | * | 11/2002 | Buckelew et al. | ............ 701/29 |
| 7,023,351 B2 | * | 4/2006 | Park | .......................... 340/608 |

FOREIGN PATENT DOCUMENTS

JP    2-121803    5/1990

* cited by examiner

*Primary Examiner*—Anh V. La
(74) *Attorney, Agent, or Firm*—Santangelo Law Offices, P.C.

(57) ABSTRACT

At least one embodiment of the inventive technology claimed herein seeks to reduce the risk of the excessive admixing of water during a concrete wetting operation by providing a system that alerts, with at least one water flow indicator, at least one individual having the ability to readily terminate the water admixing operation either that water is currently being added and/or perhaps that a certain time of water addition has elapsed. At least one embodiment of the inventive technology includes a proximity switch.

18 Claims, 12 Drawing Sheets

CONCRETE WETTING ALARM SYSTEM

BACKGROUND OF THE INVENTION

Concrete is a multi-billion dollar industry worldwide, finding application in the construction and repair of buildings, streets, walkways, paving and runways, as but a few examples. Mixing of concrete for all but the very smallest jobs typically includes mixing of dry concrete with water in a drum to form ready mixed concrete. This drum is often part of a concrete truck, and the addition of water to and admixing with the insufficiently wetted concrete—key steps in the concrete preparation process—may occur at a plant or yard, en route to the job site, or at the job site.

Regardless of when or where the water is added to the concrete, if too much water is added to the concrete, that batch of concrete will not meet performance specifications upon curing (strength, impact resistance, durability and slump, e.g.) and may have an unacceptably high propensity for cracking. Indeed, often the highest quality concrete is that mixture which contains the least amount of water that will still result in a mix that can still be readily placed, and which effectively consolidates and cures after placement. Overly wetted concrete therefore should either be further amended with more dry concrete to salvage the batch or discarded instead of used for the intended application. If an excessively wetted mixture is used, and the expensive removal and replacement with properly mixed concrete is not made, structural failure may result. Too high a water to cement ratio (excessive water proportioning) for a given application (which ratios are well-known for a given design load and/or exposure, e.g.) therefore can pose a significant problem, and can result in loss due to additional labor and perhaps excessive amounts of concrete for a job.

Although it may seem an easily avoidable problem, the industry continues to be plagued by the addition of too much water to the concrete in the concrete drum, whether due to distraction, undertaking too many job duties at once, or simple inattention of an individual(s) controlling the water addition operation. There have even been cases where excessive amounts of water have been intentionally added to the concrete in order to ease placement of the mixture. If a valve operable to control the admission of water to insufficiently wetted concrete is left in the open position for too long, too much water is added to the concrete and, as explained, the batch should thereafter be amended with additional "drier" concrete, or more expensive remedial measures (e.g., tear-out and replacement) must be taken.

It should be understood that the term concrete as used herein has a broad definition, mimicking its use in industry. It can refer to an adequately wetted concrete mixture, an insufficiently wetted concrete mixture, or a dry mix, and includes cementitious mixtures that themselves may include aggregate, gravel, fly ash, ground slag, silica fume, fibers and/or sand. The term concrete as used herein includes all types of cementitious material to which water has been or is to be added, including mortar, pervious concrete, flowable fill, ready-mixed concrete and bedding mix.

SUMMARY OF THE INVENTION

At least one embodiment of the inventive technology claimed herein seeks to reduce the risk of the excessive admixing of water in forming prepared concrete by providing a system that alerts at least one individual having the ability to readily terminate the water admixing operation either that water is currently being added and/or perhaps that a certain time of water addition has elapsed. Such alert may be provided by at least one water flow indicator that is sensible in that it can be sensed (e.g., noticed) by an individual.

DESCRIPTION OF PREFERRED EMBODIMENTS

Figure 1:
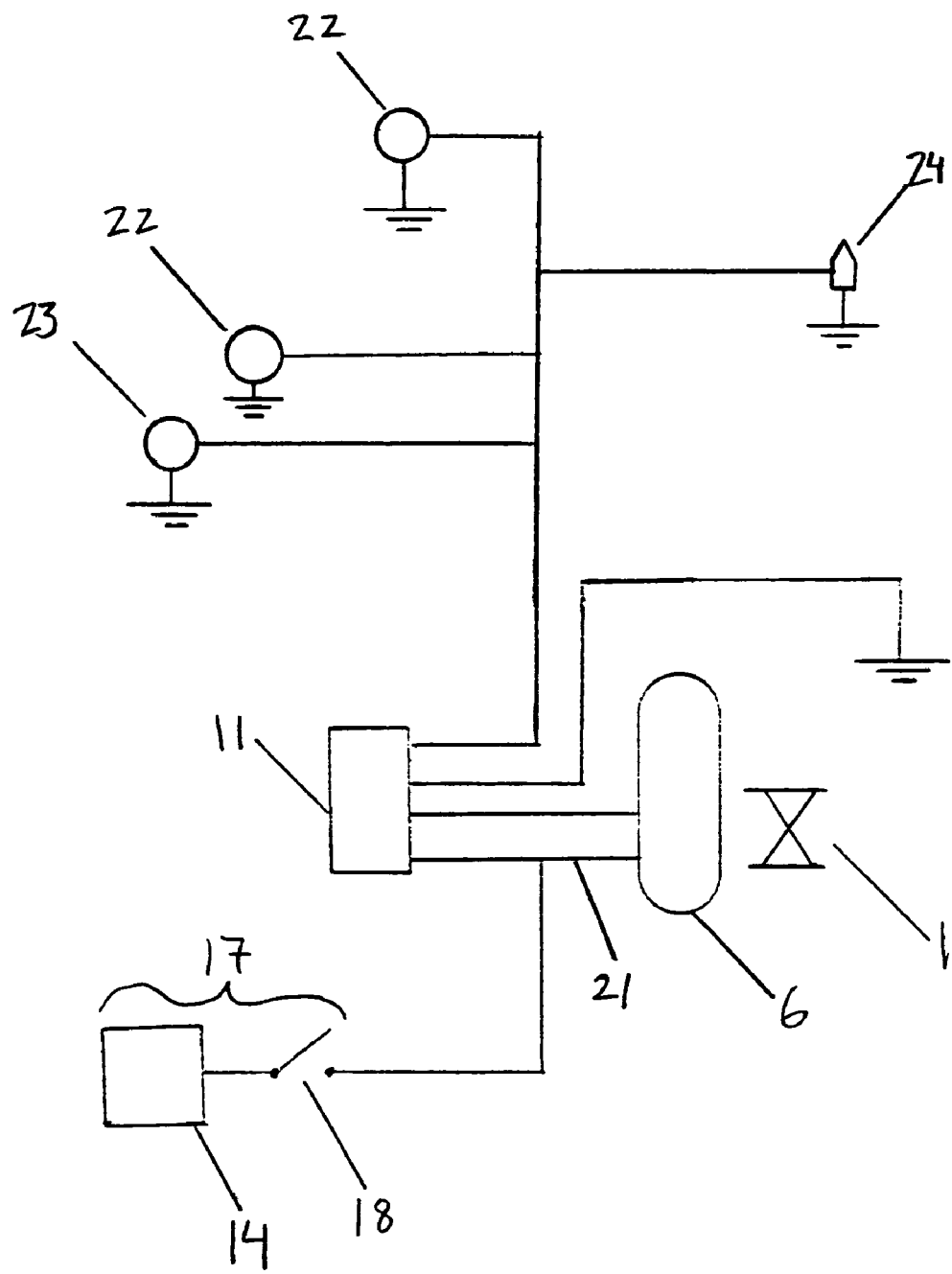
FIG. 1 shows an electrical schematic of at least one embodiment of the inventive technology having a relay.
Figure 2:
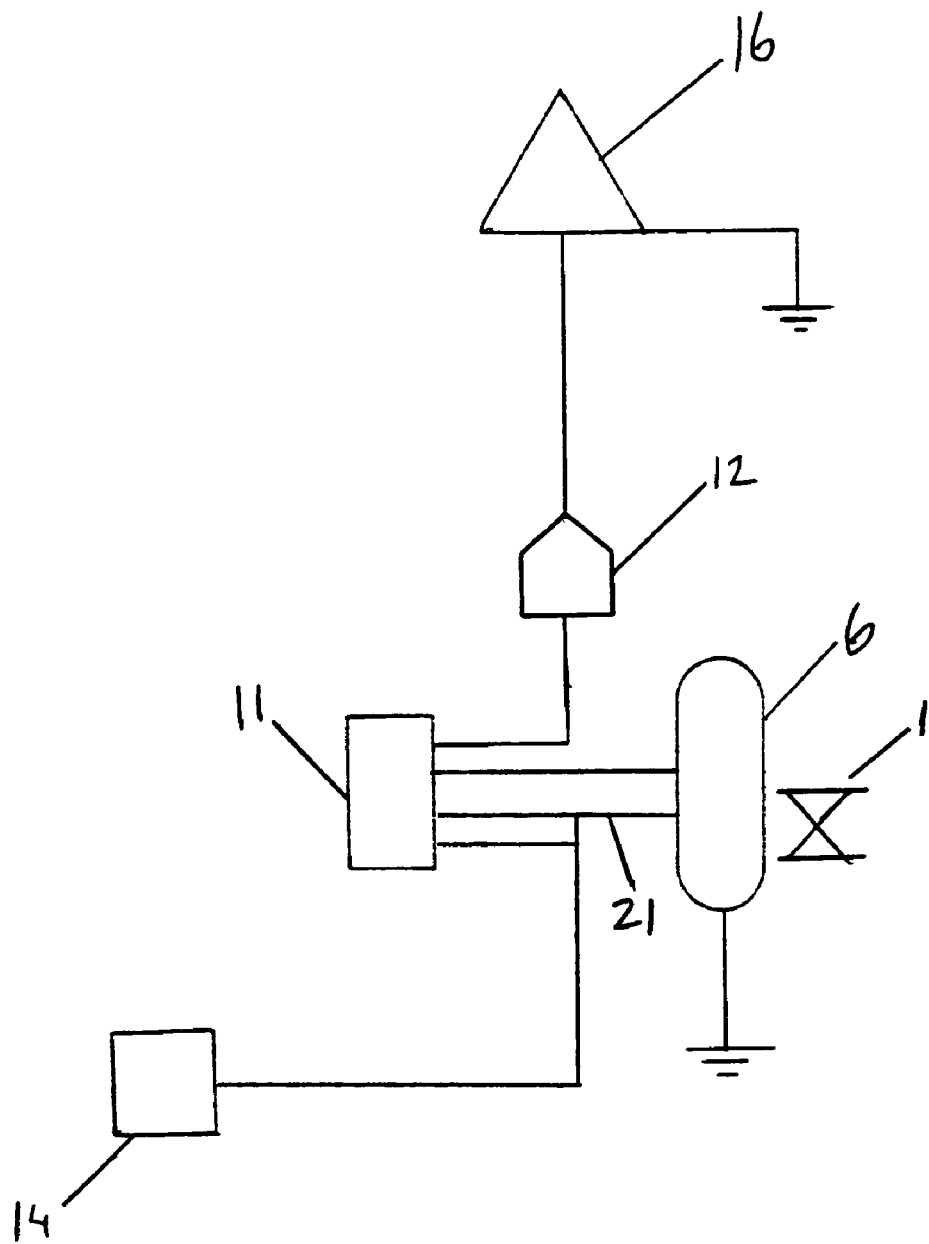
FIG. 2 shows an electrical schematic of at least one embodiment of the inventive technology having a relay.
Figure 3:
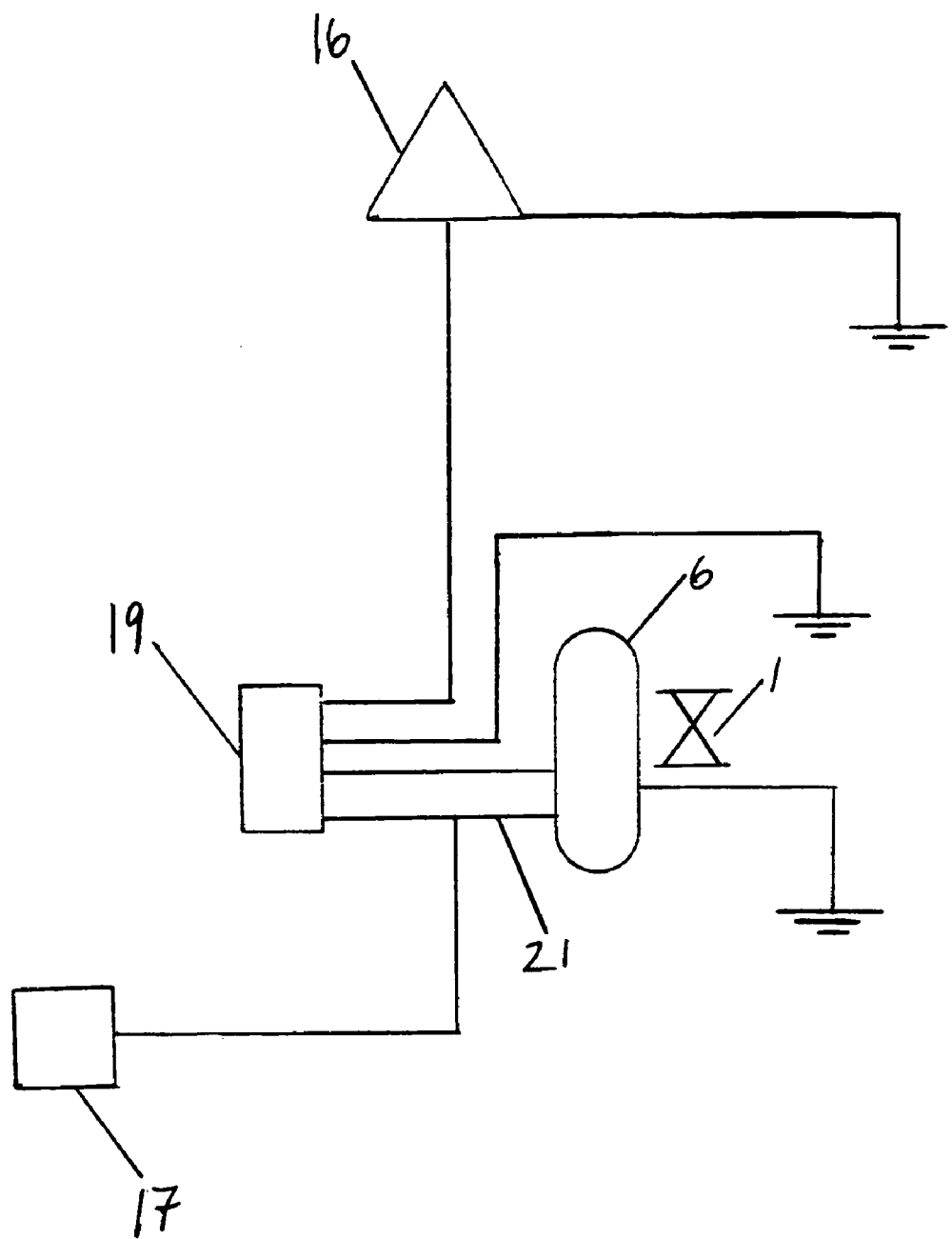
FIG. 3 shows an electrical schematic of at least one embodiment of the inventive technology having a relay

The present invention includes a variety of aspects, which may be combined in different ways. The following descriptions are provided to list elements and describe some of the embodiments of the present invention. These elements are listed with initial embodiments, however it should be understood that they may be combined in any manner and in any number to create additional embodiments. The variously described examples and preferred embodiments should not be construed to limit the present invention to only the explicitly described systems, techniques, and applications. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application.

At least one embodiment of the inventive technology comprises a valve 1 that itself may comprise a valve body 2 (a part thereof may operate to obstruct flow as desired) and an element by which the valve can be opened and closed.

Such element may be a manually operable valve handle, as is typically found as part of valves controlling the addition of water to a cement mixing drum of a cement truck 4. The valve may be changed (e.g., by manual operation of a valve handle) from a closed mode (see, e.g., FIG. 8) to an open mode (see, e.g., FIG. 7). As used herein, closed mode refers to a valve configuration wherein substantially all water flow is prevented; open mode refers to all valve configurations other than closed mode.

As shown in the figures (see, e.g., FIG. 8), some embodiments of the invention may include a part 5 that moves relative to a proximity switch 6 when the valve changes from open mode to closed mode. The proximity switch senses whether a certain object—the part—is proximal the switch (or a certain portion thereof) or, in other words, within the operating distance of the switch. The proximity switch may be established such that relative motion between the proximity switch and the part occurs when the valve is changed from closed to open mode. Such relative motion may be effected where either the part is established in fixed position relative to the valve body and the proximity switch itself moves during change of the valve mode, or where the proximity switch is established in fixed position relative to the valve body and the part itself moves during change of the valve mode. In a preferred embodiment, the latter alternative (see FIG. 7) is the chosen design.

It should be noted that in preferred embodiments, the switch used in the apparatus is a proximity switch. In some less-preferred designs, a limit switch can be used instead of a proximity switch, but the contact inherent in the operation of a limit switch can contribute to the wear of the switch, thereby decreasing its durability and expected life. As such contact is not found in the operation of a proximity switch, the proximity switch is more durable, an important feature in the harsh environment of a concrete mixing truck, and is, therefore, the preferred type of switch.

It is also of note that the term proximity switch includes both devices that combine the sensing element with the signal conditioning electronics (resulting in a comparatively self-contained device), in addition to those devices that do not include such a combination. Although both types of sensors are indeed within the ambit of the inventive technology, the preferred embodiment uses those proximity switches that combine the sensing element with the signal conditioning electronics. Further, it should be understood that the term sensor is a broad term that includes any device or element that can change a condition (e.g., an electrical condition) in response to a first change in condition (e.g., a change in position of a nearby object, or a change in water pressure, as but two examples), and therefore includes, inter alia, proximity switches and flow sensors.

Figure 7:
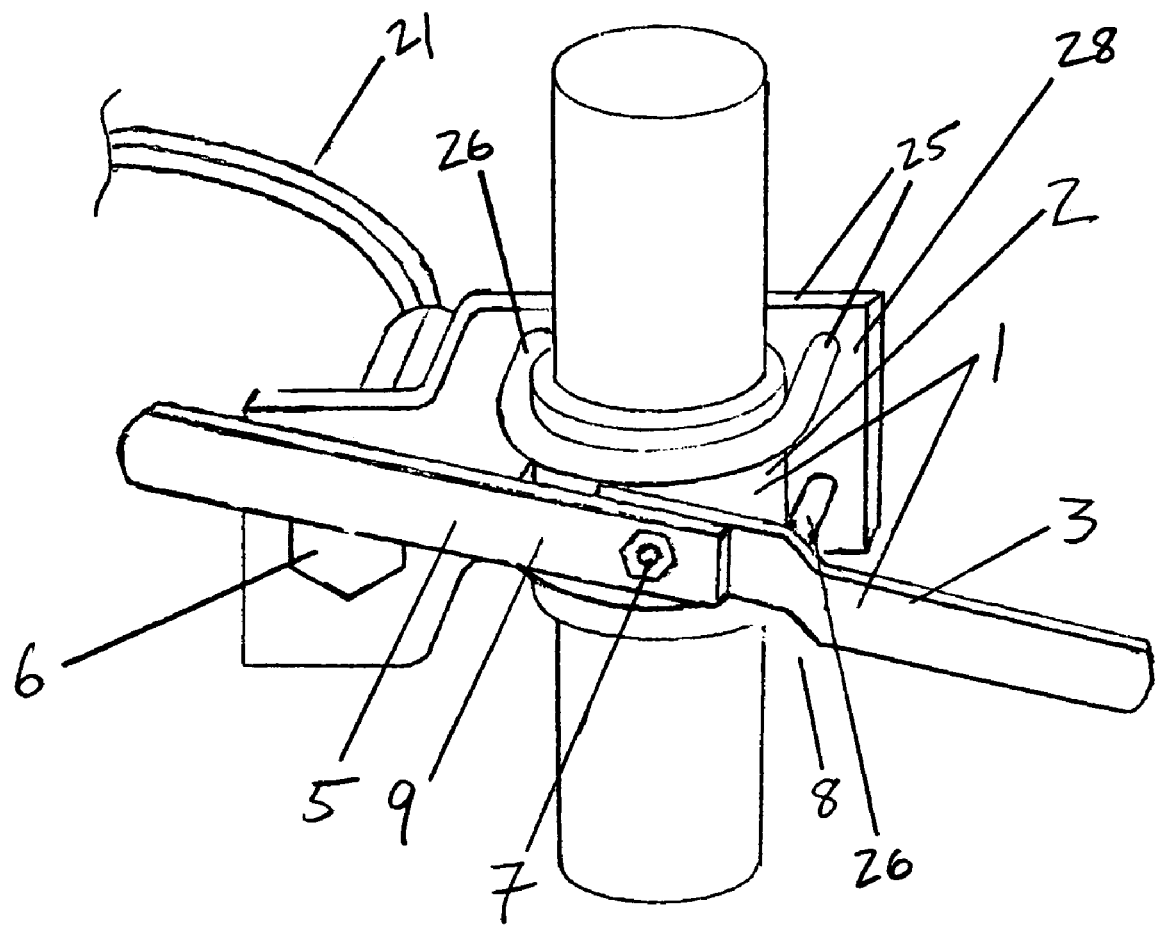
FIG. 7 shows a view of elements of a portion of the apparatus in the immediate vicinity of the valve in at least one embodiment of the inventive technology.
Figure 8:
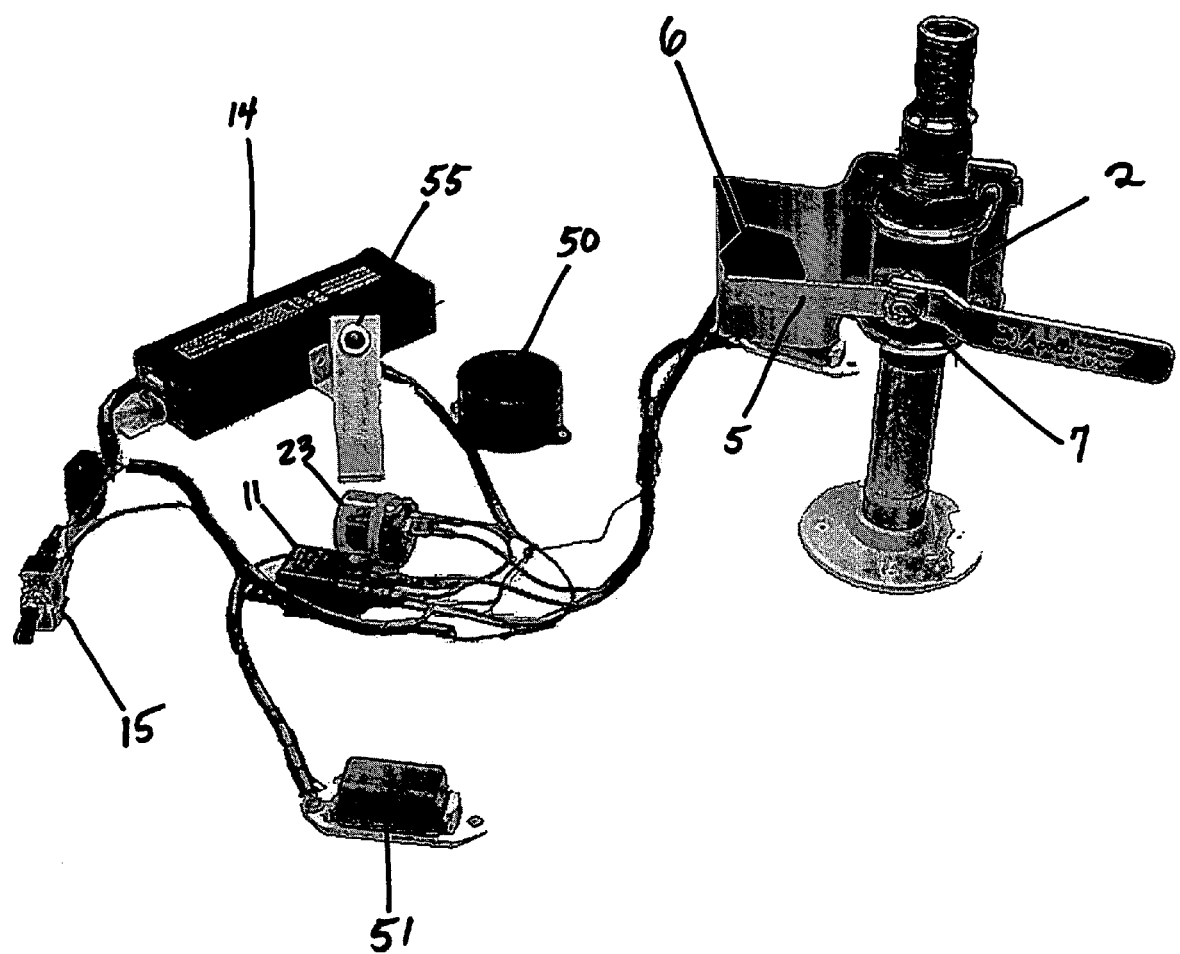
FIG. 8 shows elements of the apparatus detached from a concrete truck in at least one embodiment of the inventive technology; the valve is in a closed mode.
Figure 9:
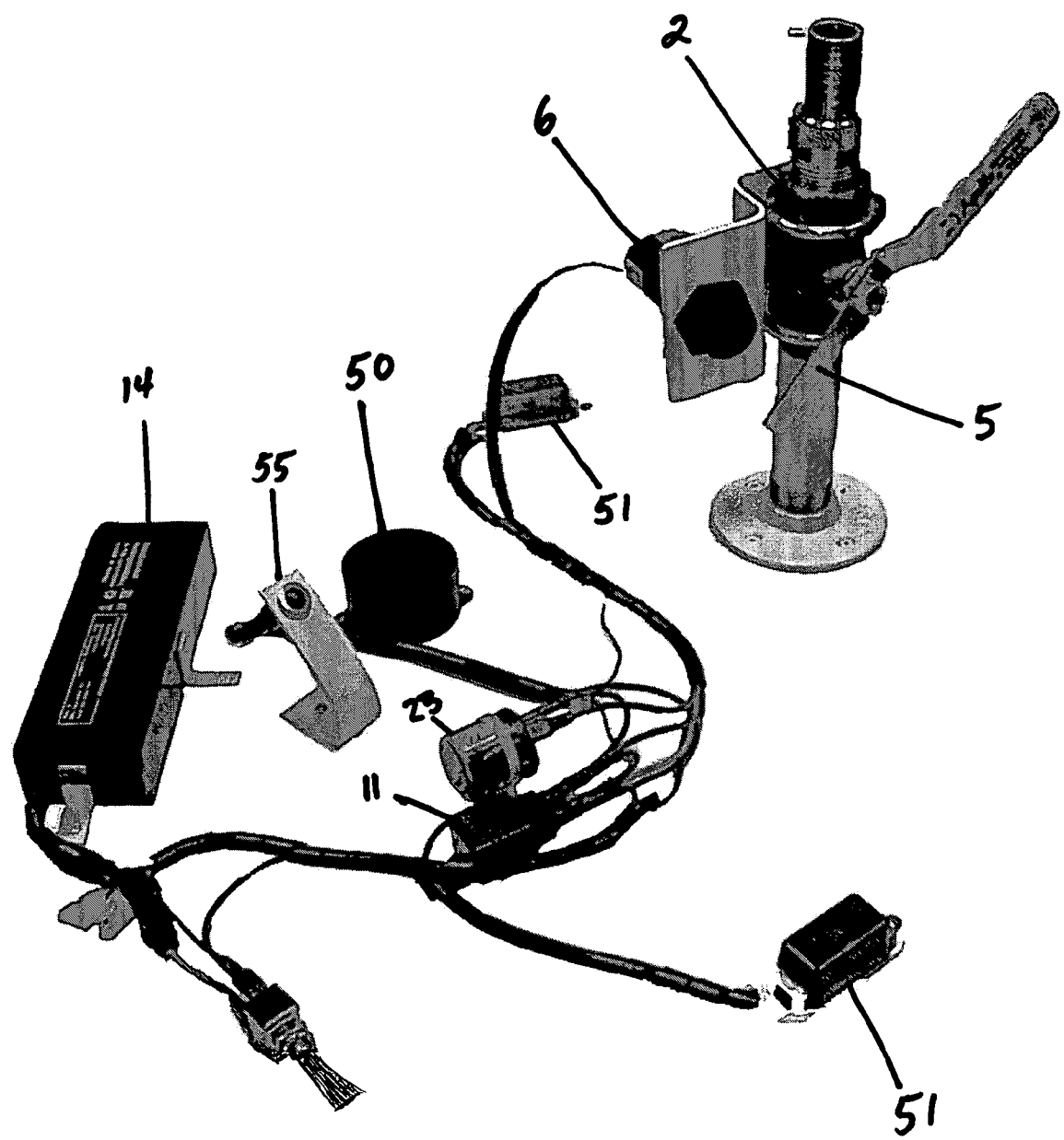
FIG. 9 shows elements of the apparatus detached from a concrete truck in at least one embodiment of the inventive technology; the valve is in an open mode.
Figure 10:
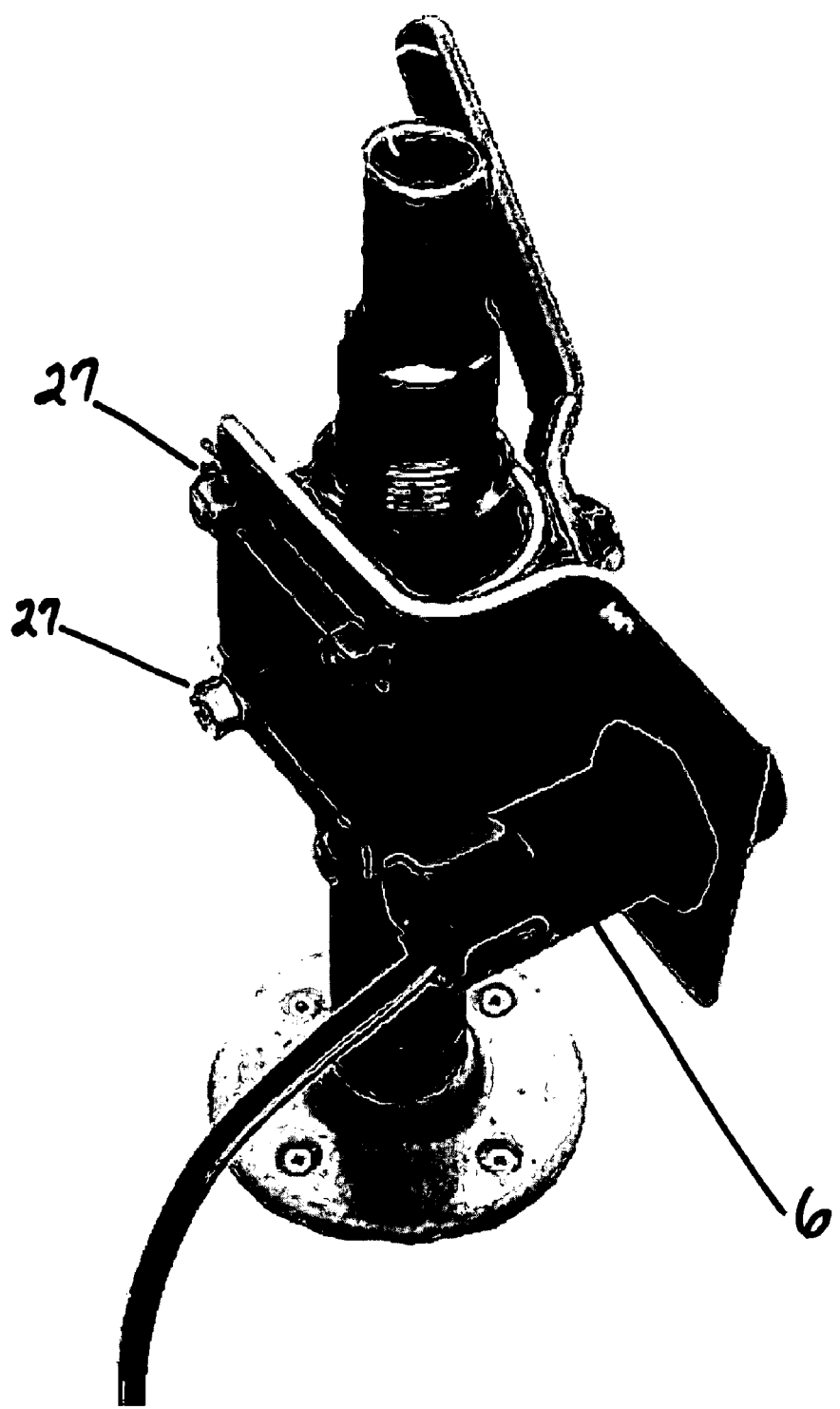
FIG. 10 shows a rear perspective view of elements of a portion of the apparatus in the immediate vicinity of the valve (open mode) in at least one embodiment of the inventive technology.
Figure 11:
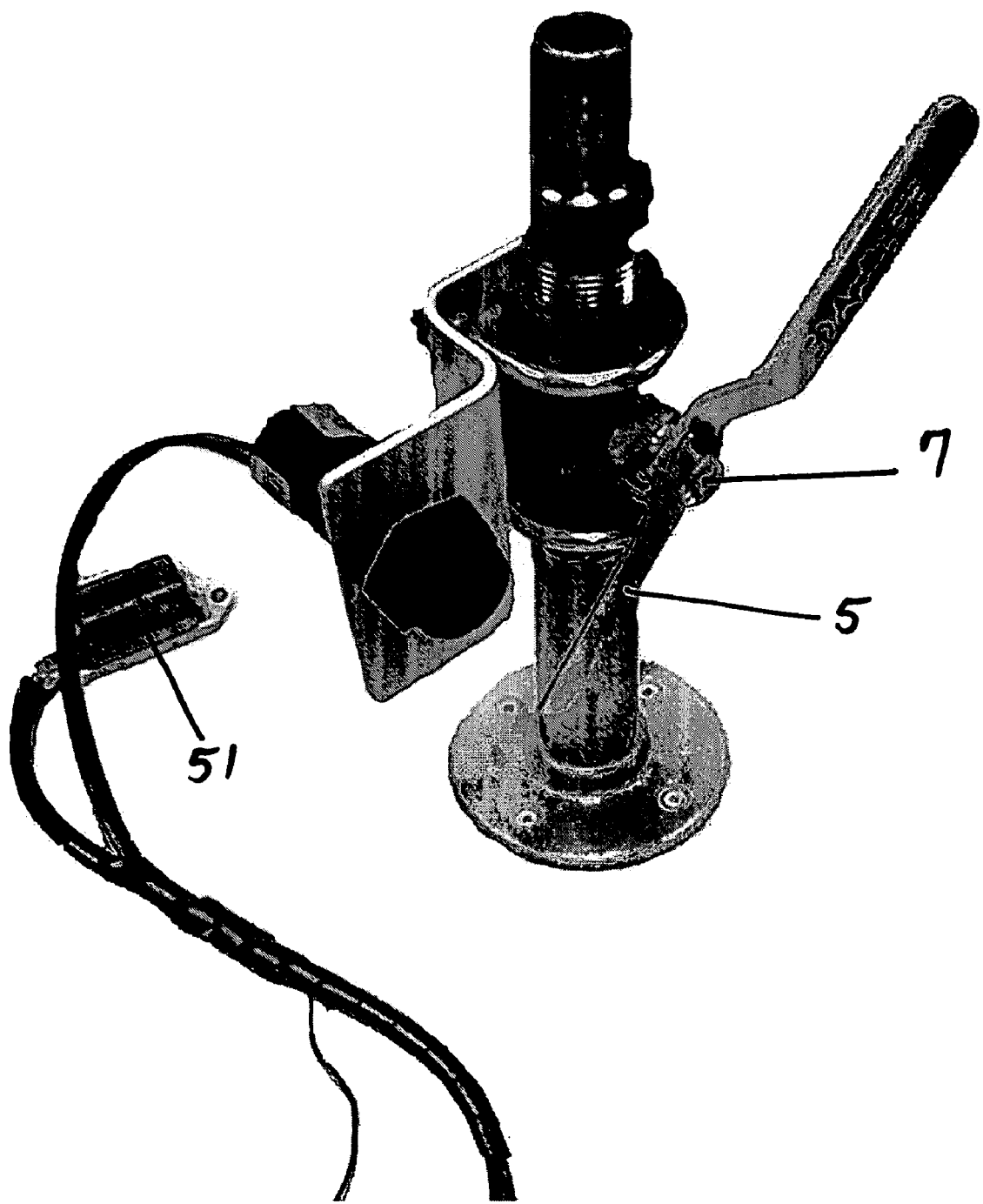
FIG. 11 shows a front perspective view of elements of a portion of the apparatus in the immediate vicinity of the valve (open mode) in at least one embodiment of the inventive technology.

In the preferred embodiment, the aforementioned relative motion between the proximity switch and the part is provided by establishing (as, e.g., by attaching in some manner) the proximity switch in fixed position relative to the valve body and establishing the part such that it moves when the valve is changed from closed mode to open mode (see, e.g., FIG. 7). The part may be so established by establishing it so that it moves when a manually operable valve handle is moved, and this may be accomplished in the case where the valve handle (or a portion thereof) is the part, or where the part is attached in fixed position relative to the valve handle. In a preferred embodiment, the latter approach is taken (see, e.g., FIG. 7), and, more specifically, the part forms an extension of the handle. Indeed, in the case where a manually operable valve handle rotates about a handle pivot 7, is secured at the handle pivot, and is established on a first side 8 of the handle pivot, the part, as a valve handle extension may be the to be secured at the handle pivot and on a second side 9 of the handle pivot (where the second side may be opposite the first side). Such a structural configuration may be very amenable to retrofitting of the apparatus onto existing valve systems, as will be discussed below. The part itself may be at least partially metallic and/or may comprise a permanent magnet 10, depending perhaps on the needs of the particular type of proximity switch that is used.

Many different types of proximity switches may be used in embodiments of the inventive technology. They include, but are not limited to: capacitive proximity switch, eddy current proximity switch, inductive proximity switch, ultrasonic proximity switch, Hall Effect proximity switch, mechanical proximity switch, environmentally sealed proximity switch, optical proximity switch, reed proximity switch and solid state proximity switch. The relative positions of the proximity switch and the part may be governed by the operating distance (also referred to in literature as the actuating or sensing distance) of the switch selected (which may be adjustable), or an operating distance as constrained by the geometries of the set-up may govern the selection of the proximity switch. As used herein, the term proximate may refer to a relative position of switch and part whereby the switch has a switch condition that is different from the switch condition observed when the switch and the part are non-proximate one another. Thus, the term proximate typically will indicate a distance that is less than (or perhaps equal to) the operating distance of the selected switch, and the term non-proximate indicating the opposite (e.g., greater than the operating distance). Actuating distances include any that characterize proximity switches, including those currently available (1 mm, 1.5 mm, 2 mm, 4 mm, as but a few of many examples). In order that the switch selected effects an alarm of sorts when (or a time after) the valve is opened, it may be necessary to iteratively adjust the positioning of the switch relative to its target (e.g., a magnet on a part).

The proximity switch may be established such that movement of the part relative to the proximity switch when the valve is changed from closed mode to open mode alters a switch condition to an altered switch condition. As used herein, the term "altered switch condition" refers to that switch condition observed when the valve is in the open mode. In preferred embodiments, the altered switch condition is an electrically closed condition (where the switch condition is altered from electrically open switch condition when the valve is in closed mode to electrically closed switch condition when the valve is in closed mode). Of course, as the reader has likely gleaned, the alteration of a switch condition refers to a change as to whether the switch can pass electrical current (electrically closed switch condition refers to an electrically closed switch circuit). It is of note that where the switch is in an electrically closed condition and the switch circuit is closed, it is necessary also that the entire circuit (including power source and any of the sensible water flow indicators) be closed for the sensible water flow indicators to be powered (the only way they can be sensed, either visually or audibly).

Electrical componentry may include electrical circuitry, wires, logic circuitry, a relay 11, a time delay element 12, a controller 13, a power source 14 (e.g., a truck battery), a switch 15 for disabling the apparatus, as but a few elements. In preferred embodiments, an electrical circuit that can provide power to sensible water flow power indicators (shown generally as 16) from a power source is configured such that it closes (and thus can provide the power as indicated) in response to the alteration of the switch condition. Again, the term "alteration of a switch condition" refers to the change in the switch condition (from electrically open to electrically closed or electrically closed to electrically open) that is observed upon the changing of the valve from closed mode to open mode. The electrical power circuit that is configured to close in response to the alteration of the switch condition might not provide power immediately upon the alteration of the switch condition (as some embodiments may include a time delay), but, even where there is provided a relay (e.g., a slave relay), it certainly may.

For those embodiments where the proximity switch is electrically powered (as not all proximity switches require electrical power), the switch may also be powered by the power source (e.g., truck battery) through one or more switch power wires 21. Powered merely indicates that, with regard to an electrically operable proximity switch, its condition (i.e., its switch condition) changes in response to the relative positioning of an object (e.g., a metal object). It is also of note that the apparatus may be "tied to" the ignition in some manner so that it is automatically disabled when a concrete mixing truck is turned off, thereby conserving power that would otherwise flow to electrically powered switches. Such a feature could be provided merely by providing a keyed power source 17, which essentially would include power wire(s) running from the battery and connected to the ignition 18 such that when the truck is turned off, no power runs to the switch, and when the truck is running, power does run to the switch. This typically would not frustrate the purpose of the apparatus, as water is rarely added to a cement truck concrete when the truck is turned off. Instead, or in addition, the apparatus may have a disabling switch that can be operated to turn the system off whenever desired.

Indeed, in particular embodiments, there may be other electrical components that must themselves be closed for the sensible water flow indicators to be powered. In at least one embodiment, a relay (e.g., a slave relay 19), which, in a preferred embodiment, switches on when the switch condition of the proximity switch is altered (e.g., changes to electrically closed), and switches off when the valve is changed to closed mode, may form a part of the electrical circuitry, with the intent, perhaps, of not applying the full power drawn by the sensible water flow indicator(s) to the proximity switch itself (which may be rated only for a lesser load). Thus, a relay can prolong the life of the switch. In other embodiments, as where the proximity switch and the part are relatively established such that changing the valve configuration from closed to open mode changes a switch condition from electrically closed to electrically open, a relay can serve not only to relieve the load applied to the proximity switch, but also to achieve the desired result of powering the sensible water flow indicator(s) during at least a portion of the time the valve is in the open mode. Any relay or microprocessor (which may be a type of controller or a part thereof, or even a part of a proximity switch) that may be used may also be powered by the power source (e.g., a battery) and may be "keyed". The electrical circuitry necessary for either of these embodiments is well within the skill of an ordinary circuit designer.

Figure 4:
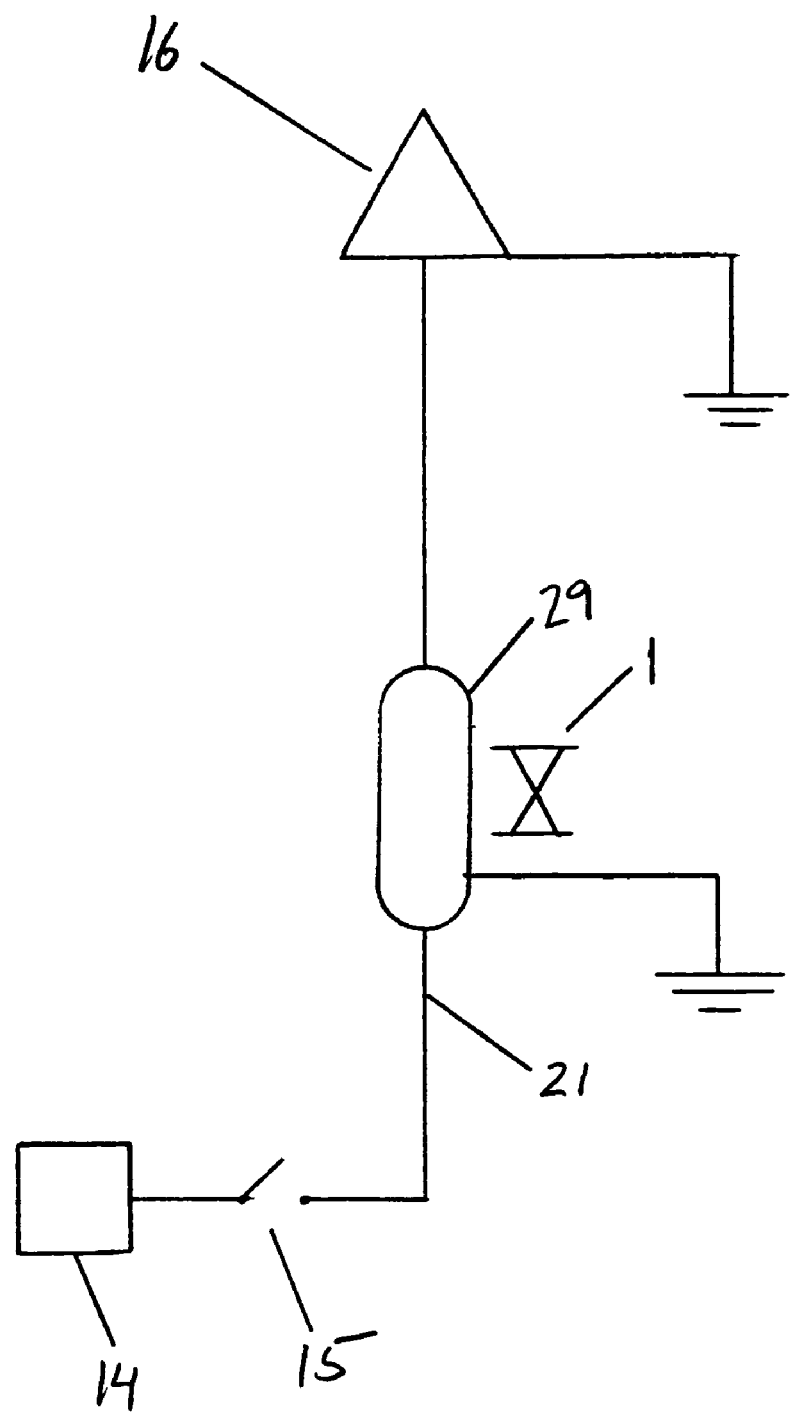
FIG. 4 shows an electrical schematic of at least one embodiment of the inventive technology without a rely.
Figure 5:
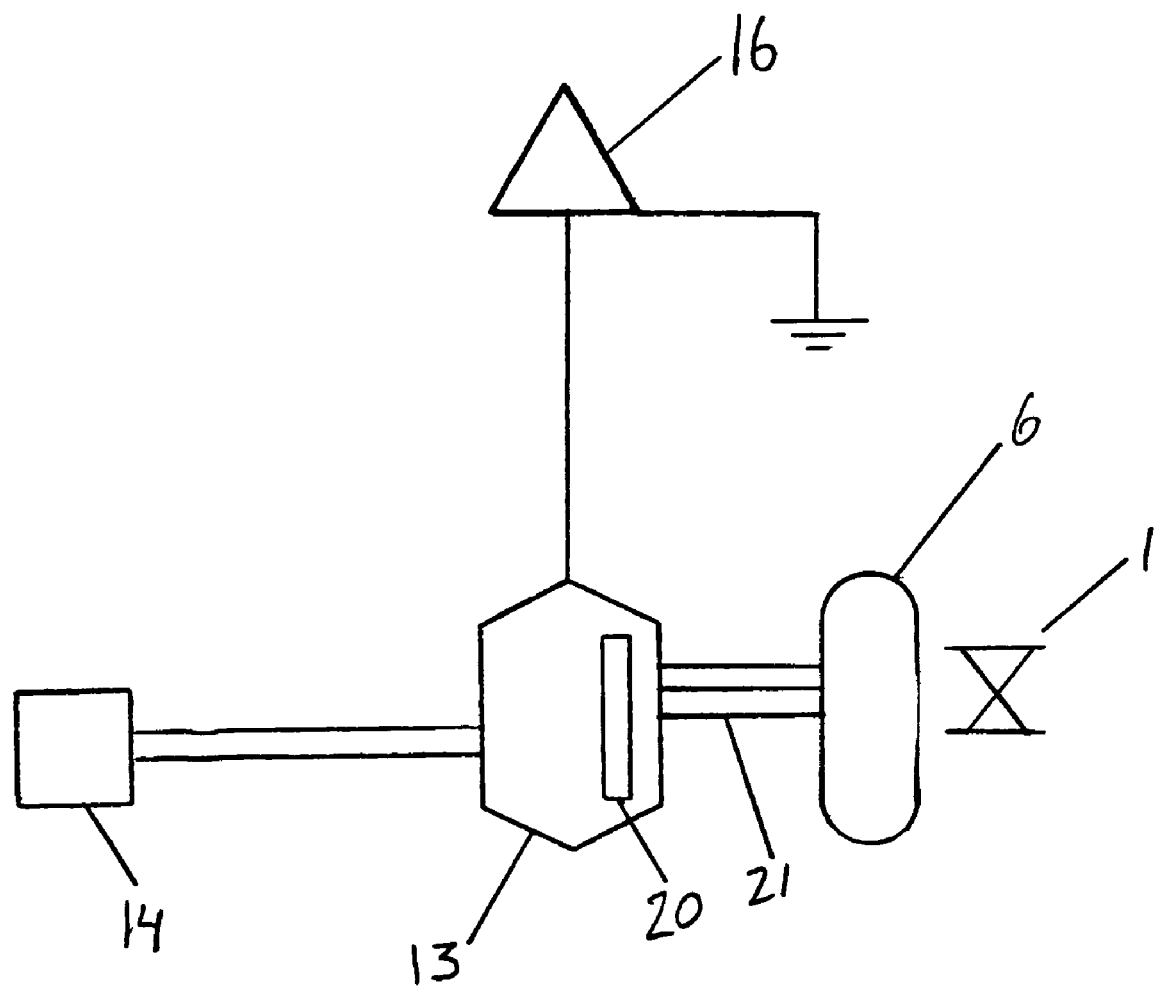
FIG. 5 shows an electrical schematic of at least one embodiment of the inventive technology having an electronic controller.
Figure 6:
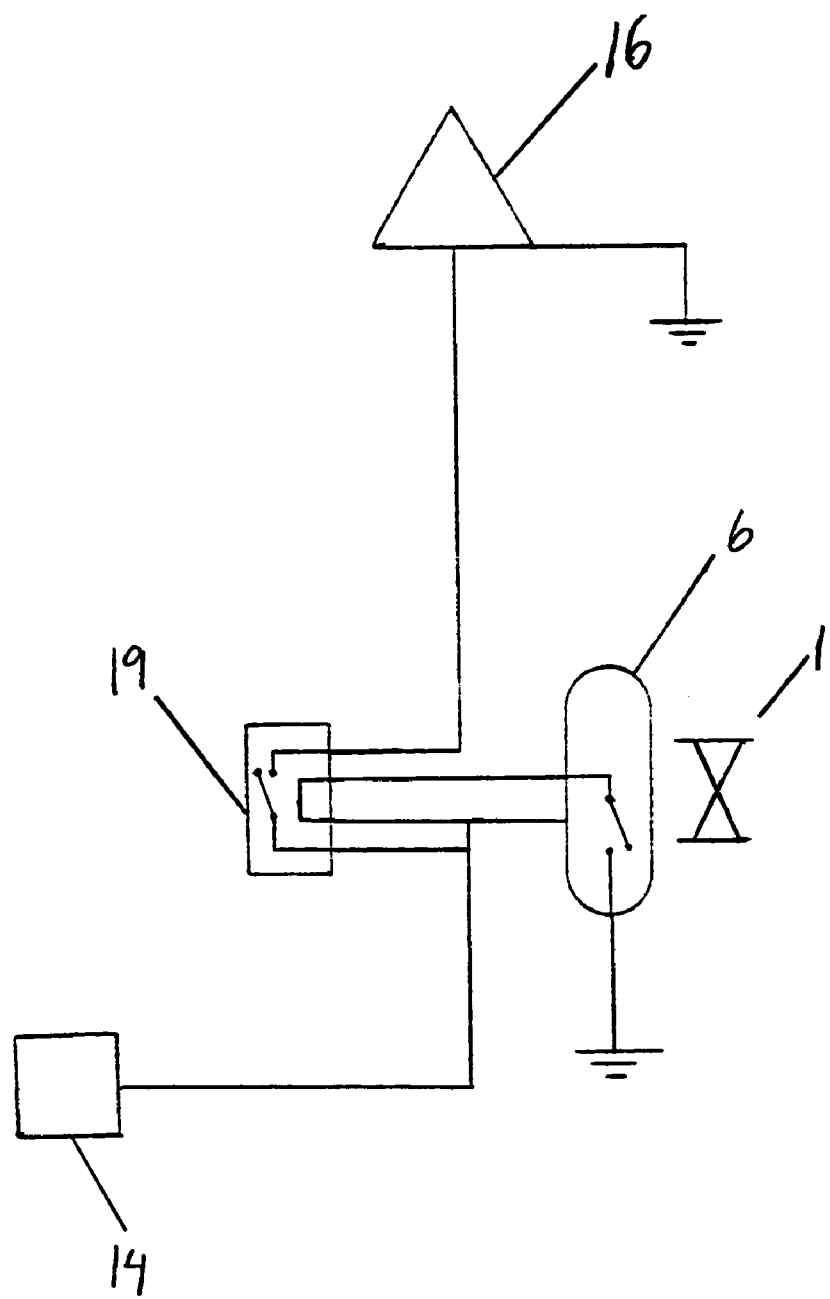
FIG. 6 shows the schematic similar to that shown in FIG. 1, in addition to depicting electrical componentry internal of the relay and proximity switch.

Such circuitry could also (or instead of the relay) have a simple microprocessor 20 as part, perhaps, of a controller that switches power to the sensible water flow indicator(s) when the switch condition is altered upon the changing of the valve from closed to open mode. In the case where there is no relay (see, e.g., FIG. 4), the circuitry can be even simpler; in such embodiments, one should take care (perhaps only by selecting the proper switch) to assure that the power passing through the proximity switch does not exceed any electrical power rating it may have.

Electrical circuitry may also include a delay element 12 that operates to delay the flow of power to the sensible water flow indicator(s) for a certain amount of time (which may be adjustable) after the valve is changed to open mode. Such a delay might be particularly useful in cases where water is to be added for a long period of time (e.g., 4 or more minutes), thereby abating the risk that the indicators are simply ignored (which risk might indeed be relatively high if the indicators are powered the instant an intended water addition operation of long duration starts). An individual could simply set the time delay such that the indicators would be powered a certain amount of time (e.g., 10 seconds) before the expected earliest duration of water addition has elapsed. For example, if it is estimated that the water addition operation will take 4 minutes, 30 seconds, the delay could be set so that the indicator(s) are powered after 4 minutes, 20 seconds. The delay element could be a time delay relay, as but one example. A microprocessor could provide the delay, of course; the necessary circuitry could be readily designed by one with ordinary skill in the art of circuit design. In those embodiments having a delay element, the at least one sensible water flow indicator may be powered only a portion of the time the switch is in the altered switch condition. Of course, where the circuitry or electrical componentry does not include any sort of delay element (see, e.g., FIG. 1), the circuit may be the to be established such that it closes the instant the switch condition of the proximity switch is altered, and the at least one sensible water flow indicator may be powered all of the time the switch is in the altered switch condition.

The apparatus may include at least one sensible water flow indicator 16. Such is simply any device that, when powered, alerts at least one individual having the ability to readily terminate the water admixing operation either simply that water is being added and also perhaps that a certain time of water addition has elapsed. Such alert may be provided by at least one water flow indicator that is sensible in that it can be sensed—noticed, either audibly, visibly, or tangibly—by an individual having the ability to readily terminate the water admixing operation (e.g., a valve operator and/or a cement mixing truck driver in the truck cabs, as but two examples), thereby alerting such individual(s) as to a certain fact relative to the water addition operation.

At least one sensible water flow indicator may be operationally responsive to the proximity switch through electrical componentry and thus may be powered at least a portion of the time the switch is in the altered switch condition. By operationally responsive is meant that the indicator(s) are powered by, e.g., a power source and wires, depending (at least in part) on whether the switch is in the altered condition (as explained above, the proximity switch is in an altered condition when the valve is in open mode). Visible indicators 22 include any type of alerting device that gains attention (i.e., alerts) after powering, and in particular by becoming more visibly outstanding relative to the surrounding environment. Visible indicators include lights such as non-flashing lights 51, flashing 23 and/or spinning lights (any of the lights may be any of a myriad of colors, including red, blue, yellow, as but a few examples). Among other places (e.g., by the water addition control valve), there may be a sensible indicator in the cab of the truck 55. Audible indicators 24 include any type of alerting device that gains attention upon powering by becoming more audibly outstanding relative to the aural environment and include sirens, horns, buzzer 50 or any of a myriad of attentiongetting noise makers. Tangible indicators include any type of alerting device that gains attention upon powering by becoming noticeable "by feel", similar to the vibrating feature commonly found on cell phones.

Figure 12:
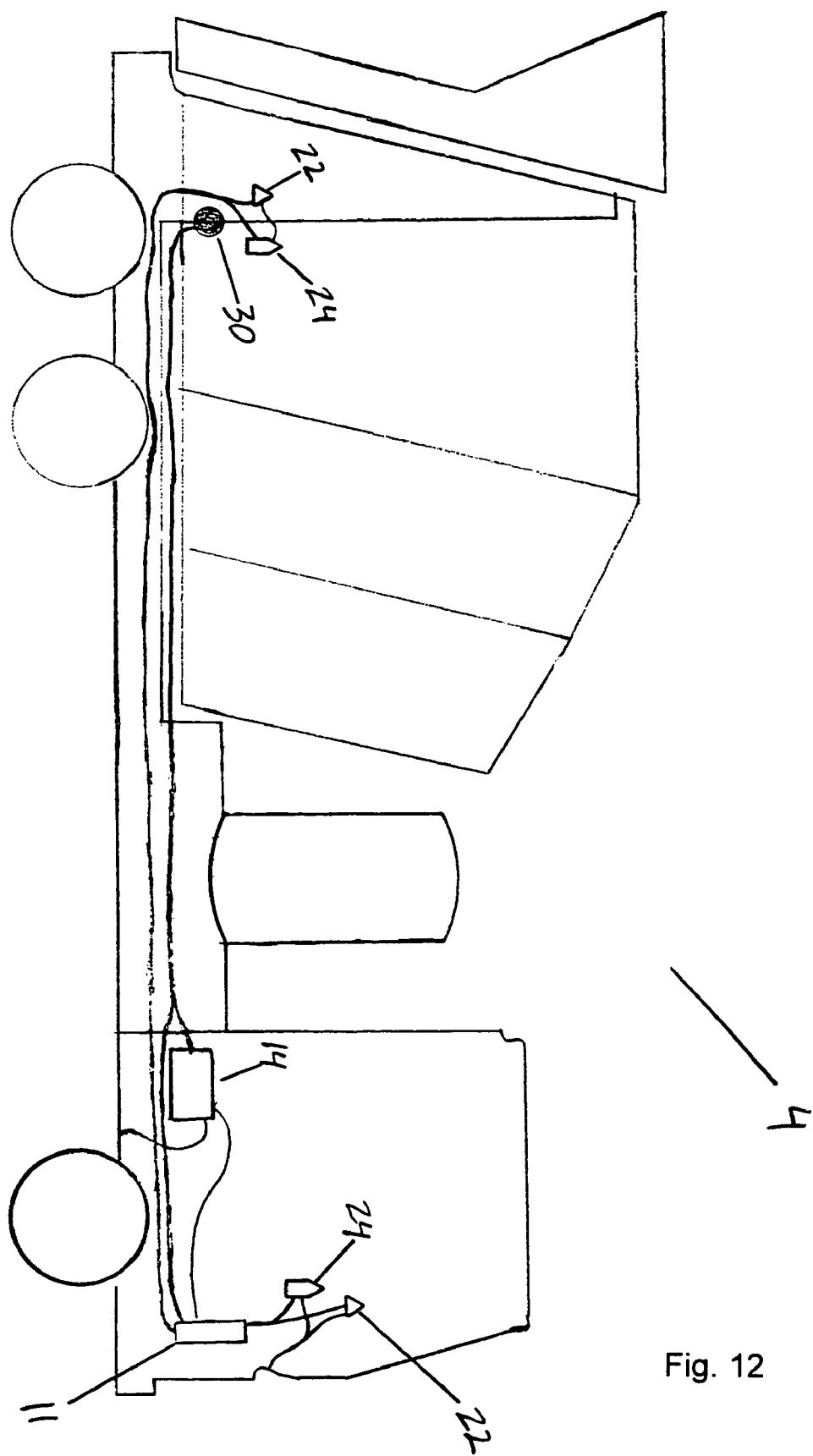
FIG. 12 shows a generalized view of certain elements of the apparatus as they might appear on a concrete mixing truck.

As alluded to above, certain of the embodiments of the inventive technology may relate to an apparatus that is easily retrofittable onto existing concrete trucks so as to provide these trucks with the advantages afforded by the water flow alerting system. Indeed, the proximity sensor may be retrofit onto the truck in the area of the water addition valve by attachment componentry 25, and without requiring breach of piping or the valve. So too may the part (where it is not simply the handle) be retrofit onto the truck, perhaps as an extension of the valve handle (as but one example). The attachment componentry may be used to attach the proximity switch relative to the part (which, again, also may be attached by attachment componentry) such that changing the valve from closed mode to open mode alters a switch condition. The attachment componentry that may attach the proximity switch in the vicinity of the valve body may comprise at least two U bolts 26 and nuts 27 that act to attach a support 28 for the proximity switch, thereby retaining it in fixed position relative to the valve body. The proximity switch may be secured to the support in any number of ways, including but not limited to interference fit, adhesive and screw threading, as but a few examples. Where the part 5 is not the valve handle (see, FIG. 7, e.g.), the part may be attached via a nut to the bolt around which the valve handle may rotate. The electrical componentry and the at least one sensible water flow indicator may also be easily retrofit onto a concrete truck by "grabbing" power and wiring, perhaps with a relay and/or delay element, as appropriate. The apparatus shown in FIG. 7 is an embodiment of the many embodiments depicted generally by 30 of FIG. 12.

It should be noted that not all embodiments are retrofits. Indeed, certain embodiments of the inventive technology, instead of being retrofit onto a concrete mixing truck after it leaves the factory, may have the apparatus incorporated into their design at the factory. It is also of note that in preferred embodiments, whether the apparatus is retrofittable or not, most (if not all) of the components can be purchased in ready-to-use condition; the support 28 for the proximity sensor may require unique shaping and therefore may not be commercially available in a ready-to-use condition. Where there are no commercially available supports having the required shape, simple well known bending, shaping or molding techniques (as but a few) can be employed to create the support out of plastic, fiberglass, or metal, as but a few examples.

At least one embodiment may address the use of a water flow sensor 29, which is any device (including a proximity switch) that, when configured properly, can sense in some manner (including indirectly, as may be the case with a proximity switch) the flow of water. In such embodiment(s), the apparatus may comprise a valve for controlling the admission of water to insufficiently wetted concrete in the drum of a concrete truck, this valve changeable from a closed mode to an open mode; a water flow sensor 29 established such that that changing of the valve from the closed mode to the open mode results in an altered condition (such as an altered electrical condition such as a change from an open to a closed circuit); and at least one sensible water flow indicator 16 that is operationally responsive to the water flow sensor through electrical componentry and that is powered at least a portion of the time the apparatus exhibits the altered electrical condition. The electrical componentry may itself comprise a power source 14 that powers the at least one sensible water flow indicator upon the change in the valve from the closed mode to the open mode; and electrical circuitry configured to provide power from the power source to the at least one sensible water flow indicator. Although indeed the term water flow sensor includes those devices that sense the flow of water indirectly (again, such as the proximity switch on which certain of the embodiments of the inventive technology focus), it also includes those apparatus that sense the flow of water directly, such as mechanical devices having a plunger that breaches the pipe downstream of the valve and that changes position in response to impact pressure increase of water flowing against a side of the plunger.

A method that addresses a water flow sensor may comprise the steps of changing a valve for controlling the admission of water to insufficiently wetted concrete in the drum of a concrete truck from a closed mode to an open mode; altering a condition of a water flow sensor upon performing the step of changing the valve from a closed mode to an open mode; passing power through electrical circuitry as a result of performing the step of altering an electrical condition of the water flow sensor; and powering at least one sensible water flow indicator upon performing the step of passing power through electrical circuitry. It should be noted that descriptions provided above relative to embodiments that focus on a proximity switch (e.g., the description addressing electrical circuitry) may just as equally apply to those embodiments that focus on a water flow sensor.

As can be easily understood from the foregoing, the basic concepts of the present invention may be embodied in a variety of ways. It involves both risk abating techniques (e.g., abating the risk of overwetting concrete) as well as devices to accomplish the appropriate risk abatement. In this application, the techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The reader should be aware that the specific disclosure provided herein may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Apparatus claims may not only be included for the device described, but also method or process claims may be included to address the functions the invention and each element performs. Neither the description nor the terminology is intended to limit the scope of the claims included herein as part of the specification, or later added or filed, whether in this or a related application for patent.

It should also be understood that a variety of changes may be made without departing from the essence of the invention. Such changes are also implicitly included in the description. They still fall within the scope of this invention. A broad disclosure encompassing both the explicit embodiment(s) shown, the great variety of implicit alternative embodiments, and the broad methods or processes and the like are encompassed by this disclosure and may be relied upon by the claims of this or related patent applications. With this understanding, the reader should be aware that this disclosure is to be understood to support as broad a base of claims as deemed within the applicant's right and is designed to yield a patent covering numerous aspects of the invention both independently and as an overall system.

Further, each of the various elements of the invention and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "switch" should be understood to encompass disclosure of the act of "switching"—whether explicitly discussed or not—and, conversely, were there effectively disclosure of the act of "switching", such a disclosure should be understood to encompass disclosure of a "switch" and even a "means for switching" Such changes and alternative terms are to be understood to be explicitly included in the description.

Any acts of law, statutes, regulations, or rules mentioned in this application for patent; or patents, publications, or other references mentioned in this application for patent are hereby incorporated by reference. In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated by reference. Finally, all references listed in the list of the information statement filed with the application are hereby appended and hereby incorporated by reference. However, as to each of the above, to the extent that such information or statements incorporated by reference might be considered inconsistent with the patenting of this/these invention(s) such statements are expressly not to be considered as made by the applicant(s).

Thus, the applicant(s) should be understood to have support to claim and make a statement of invention to at least: i) each of the water flow alarm devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) each system, method, and element shown or described as now applied to any specific field or devices mentioned, x) methods and apparatuses substantially as described hereinbefore and with reference to any of the accompanying examples, xi) the various combinations and permutations of each of the elements disclosed, and xii) each potentially dependent claim or concept as a dependency on each and every one of the independent claims or concepts presented.

In addition and as to computer aspects and each aspect amenable to programming or other electronic automation, the applicant(s) should be understood to have support to claim and make a statement of invention to at least: xii) processes performed with the aid of or on a computer as described throughout the above discussion, xiv) a programmable apparatus as described throughout the above discussion, xv) a computer readable memory encoded with data to direct a computer comprising means or elements which function as described throughout the above discussion, xvi) a computer configured as herein disclosed and described, xvii) individual or combined subroutines and programs as herein disclosed and described, xviii) the related methods disclosed and described, xix) similar, equivalent, and even implicit variations of each of these systems and methods, xx) those alternative designs which accomplish each of the functions shown as are disclosed and described, xxi) those alternative designs and methods which accomplish each of the functions shown as are implicit to accomplish that which is disclosed and described, xxii) each feature, component, and step shown as separate and independent inventions, and xxiii) the various combinations and permutations of each of the above.

With regard to claims whether now or later presented for examination, it should be understood that for practical reasons and so as to avoid great expansion of the examination burden, the applicant may at any time present only initial claims or perhaps only initial claims with only initial dependencies. Support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible.

Finally, any claims set forth herein or at any later time are hereby incorporated by reference as part of this description of the invention, and the applicant expressly reserves the right to use all of or a portion of such incorporated content of such claims as additional description to support any of or all of the claims or any element or component thereof. The applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

What is claimed is:

1. A method comprising the steps of:
   changing a valve for controlling the admission of water to insufficiently wetted concrete from a closed mode to an open mode;
   changing the position of a part from a position proximate a proximity switch to a position non-proximate said proximity switch upon performing said step of changing a valve from a closed mode to an open mode;
   altering a switch condition of said proximity switch upon performing said step of changing the position of a part from a position proximate a proximity switch to a position non-proximate said proximity switch;
   passing power through electrical circuitry as a result of said step of altering a switch condition of said proximity switch; and
   powering at least one sensible water flow indicator upon performing said step of passing power through electrical circuitry.

2. The method as described in claim 1 wherein said step of changing the position of a part from a position proximate a proximity switch to a position non-proximate said proximity switch comprises the step of moving said part from said position proximate said proximity switch to said position non-proximate said proximity switch.

3. The method as described in claim 2 wherein said part is a valve handle extension.

4. The method as described in claim 1 wherein said step of altering a switch condition of said proximity switch comprises the step of altering said switch condition from an electrically open switch condition to an electrically closed switch condition.

5. The method as described in claim 1 wherein said step of passing power through electrical circuitry as a result of said step of altering a switch condition of said proximity switch comprises the step of passing power through electrical circuitry immediately upon performing said step of altering a switch condition of said proximity switch.

6. The method as described in claim 1 wherein said step of passing power through electrical circuitry as a result of said step of altering a switch condition of said proximity switch comprises the step of passing power through a slave relay switch.

7. The method as described in claim 1 wherein said step of powering at least one sensible water flow indicator comprises the step of powering at least one sensible water flow indicator selected from the group consisting of: an audible indicator and a visible indicator.

8. A valve retrofit method comprising the steps of:
   establishing a proximity switch such that:
      relative motion between said proximity switch and a part occurs when a valve is changed from a closed mode to an open mode:
      a switch condition of said proximity switch is altered when said valve is changed from said closed mode to said open mode;
   said method further comprising the steps of:
   establishing an electrical circuit so that it closes in response to said alteration of said switch condition of said proximity switch; and
   connecting at least one sensible water flow indicator so that it is powered when said electrical circuit is closed, wherein said valve is usable to control the admission of water to insufficiently wetted concrete.

9. The method as described in claim 8 wherein said step of establishing an electrical circuit so that it closes in response to said alteration of said switch condition of said proximity switch comprises the step of establishing said electrical circuit so that it closes the instant said switch condition of said proximity switch is altered.

10. The method as described in claim 8 further comprising the step of establishing a delay element as part of said electrical circuit.

11. The method as described in claim 8 wherein said step of establishing a proximity switch such that relative motion between said proximity switch and a part occurs when a valve is changed from a closed mode to an open mode comprises the step of establishing said proximity switch in fixed position relative to a valve body such that said part moves when said valve is changed from said closed mode to said open mode.

12. The method as described in claim 11 further comprising the step of establishing said part as an extension of a manually operable valve handle.

13. The method as described in claim 8 wherein said step of establishing a proximity switch such that a switch condition of said proximity switch is altered when said valve is changed from said closed mode to said open mode comprises the step of establishing said proximity switch such that said switch condition of said proximity switch is altered from an electrically open switch condition to an electrically closed switch condition when said valve is changed from said closed mode to said open mode.

14. The method as described in claim 8 wherein said step of establishing an electrical circuit so that it closes in response to said alteration of said switch condition of said proximity switch comprises the step of establishing a slave relay as part of said electrical circuit.

15. The method as described in claim 8 wherein said step of connecting at least one sensible water flow indicator comprises the step of connecting an audible indicator.

16. The method as described in claim 8 wherein said step of connecting at least one sensible water flow indicator comprises the step of connecting a visible indicator.

17. The method as described in claim 8 wherein said part that moves when the valve is changed from the closed mode to the open mode is at least partially metallic.

18. The method as described in claim 8 wherein said part that moves when the valve is changed from the closed mode to the open mode comprises a permanent magnet.

* * * * *